United States Patent
Ionascu et al.

(10) Patent No.: US 10,559,032 B2
(45) Date of Patent: Feb. 11, 2020

(54) CREATION AND REDEMPTION FOR ETP SHARES OF BULKY METALS

(75) Inventors: Andrei Ionascu, Orinda, CA (US); Russell Latham, San Francisco, CA (US); Brian Johnson, San Rafael, CA (US)

(73) Assignee: BLACKROCK INSTITUTIONAL TRUST COMPANY, N.A., San Francisco, CA (US)

( * ) Notice: Subject to any disclaimer, the term of this patent is extended or adjusted under 35 U.S.C. 154(b) by 0 days.

(21) Appl. No.: 13/206,478

(22) Filed: Aug. 9, 2011

(65) Prior Publication Data

US 2012/0036059 A1 Feb. 9, 2012

Related U.S. Application Data

(60) Provisional application No. 61/372,069, filed on Aug. 9, 2010.

(51) Int. Cl.
G06Q 40/00 (2012.01)
G06Q 40/04 (2012.01)

(52) U.S. Cl.
CPC .................... *G06Q 40/04* (2013.01)

(58) Field of Classification Search
CPC .............. G06Q 40/00; G06Q 40/04
USPC ................................ 705/35–40
See application file for complete search history.

(56) References Cited

U.S. PATENT DOCUMENTS

| | | | |
|---|---|---|---|
| 7,865,426 B2 * | 1/2011 | Volpert | 705/37 |
| 7,937,316 B2 | 5/2011 | Friedman et al. | |
| 8,285,621 B1 * | 10/2012 | Bak | G06Q 40/04 705/36 R |
| 2005/0044022 A1 * | 2/2005 | Spirgel et al. | 705/35 |
| 2006/0111999 A1 | 5/2006 | Spirgel et al. | |
| 2008/0082436 A1 * | 4/2008 | Shalen | G06Q 40/04 705/36 R |
| 2009/0063364 A1 * | 3/2009 | O'Connell | G06Q 20/10 705/36 R |
| 2009/0083196 A1 * | 3/2009 | Volpert | 705/36 R |

(Continued)

OTHER PUBLICATIONS

Curran: "Investing in Funds: A Quarterly Analysis—Alternative Investments: Quirks of Commodities Funds—In some market", Wall Street Journal, Eastern edition; New York, N.Y. [New York, N.Y] (Year: 2010).*

(Continued)

*Primary Examiner* — Edward J Baird
(74) *Attorney, Agent, or Firm* — Fenwick & West LLP

(57) ABSTRACT

To create shares of an ETP based on a bulky metal, an authorized participant (AP) provides an amount of material, such as base or bulky metal, that is within an allowable range of the target value. A central intermediary intermediates the transfer of the mismatched weight between the ETP and the AP to bring the amount of the applicable material or bulky metal to the exact amount needed for the creation (or redemption, in the reverse transaction) of the ETP shares. The ownership of the last unit of bulky metal transferred in relation to the transaction is divided between the equalization facility and the ETP through the booking of account receivable/account payable transactions. The AP then pays or receives cash from the equalization facility based on whether too little or too much metal was transferred.

20 Claims, 3 Drawing Sheets

(56) References Cited

U.S. PATENT DOCUMENTS

2010/0174664 A1 7/2010 Kelly et al.
2011/0258102 A1* 10/2011 Blasi .............................. 705/37

OTHER PUBLICATIONS

ETF Securities US LLC, "ETFS Physical Base Metals Trust" United States Securities and Exchange Commission, Feb. 22, 2011, 107 Pages, [online][retrieved on Nov. 22, 2011] Retrieved from the Internet <URL:http://www.sec.gov/Archives/edgar/data/1513348/000093041311001172/c64409_s-1.htm#c64409a009_vl>.

\* cited by examiner

CREATION AND REDEMPTION FOR ETP SHARES OF BULKY METALS

CROSS REFERENCE TO RELATED APPLICATIONS

This application claims the benefit of U.S. Provisional Patent Application No. 61/372,069 filed Aug. 9, 2010, entitled "Creation and Redemption for ETP Shares of Bulky Metals," which is hereby incorporated by reference in its entirety.

BACKGROUND

This invention relates generally to financial services and products, and more particularly to financial systems that enable an exchange traded product (ETP) based on physical commodities or materials that are not stored in lots of uniform size and shape, and/or are not readily divisible or accessible/tradable in the quantities that may be desired in the marketplace. In particular, embodiments of the invention are described in connection with an ETP that holds base or bulky metals, but embodiments of the invention may be applied to other types of funds or products.

Unlike with certain precious metals such as gold or silver, many base metals such as copper and aluminum are traded and stored in bulky weight denominations (e.g., 25,000 kg). This creates problems for the creation and redemption of ETP shares based on these metals, since the bulky size results in a mismatch of weight transferred for a fixed number of ETP shares. For example, when an authorized participant (AP) wants to create new shares of an ETP based on physical gold owned by the ETP, the AP delivers an amount of gold exactly equal to the value of the ETP shares to be created in exchange for shares of the ETP. This is because gold can be traded in unallocated amounts in addition to full bars of gold such that the AP can trade gold bars up to the closest value of the ETP shares and the remaining amount to equal to the ETP shares in unallocated form. In contrast, base metals are traded in bulky sized lots with a permitted level of deviation in the final delivered amount, hence the AP usually cannot deliver a precise amount of the base metal that corresponds to the value to create a standard lot (i.e., a fixed number) of ETP shares, thus causing a mismatch in the economic value transferred. Base metals do not have an equivalent means of trading in unallocated amounts that are available to precious metals such as gold and silver.

In many cases, it may be undesirable to offset the mismatch using simple cash transfers between the ETP and the AP. Cash transfers might be avoided by entering into contractual arrangements between each AP and the ETP, but this could result in the ETP owning a portion of a large number of individual lots of bulky metal (or any other asset not readily divisible), thereby increasing the ETP's exposure to risk, holding large cash positions that are not backed by the physical metal desired by the ETP for purposes of its investment strategy or generally causing under or over exposure to the physical metal in relation to the value of the ETP shares delivered/redeemed by the ETP. This would also make operation of the ETP complex and inefficient, thereby reducing its market competitiveness or ability to meet its investment purpose. There is therefore a need in the market for a method by which the difference in value between an amount of an indivisible commodity and corresponding ETP shares can be compensated for in the creation and redemption processes for the ETP.

SUMMARY OF THE INVENTION

In accordance with embodiments of the invention, to create shares of an ETP, an AP delivers an amount of metal or other material required for proper delivery that is within an allowable range of the target value of the created ETP shares. A central intermediary, or "equalization facility," intermediates the transfer of the mismatched weight between the ETP and the AP to bring the amount of the metal to the exact amount needed for the creation (or redemption, in the reverse transaction) of the ETP shares. Rather than physically splitting the metal used in the creation/redemption transaction, which may be impractical or impossible, partial ownership of a separate "equalization lot" of the bulky asset is transferred between the equalization facility and the ETP. The AP then pays or receives cash from the equalization facility based on whether too little or too much weight is transferred in connection with a creation or redemption. This process may obviate the need to use cash transfers to and/or from the ETP to offset the difference between the delivered assets and the value of the ETP shares to be created or redeemed and keeps the assets of the ETP in the physical metal that the value of the ETP shares are designed to reflect.

BRIEF DESCRIPTIONS OF THE DRAWINGS

DETAILED DESCRIPTION

Investors commonly invest in different types of investment funds and financial products to gain exposure to various types of assets, including stocks, bonds, commodities and derivatives. A very popular type of fund is an exchange-traded fund (ETF). Other exchange traded vehicles have also emerged over the years, such as exchange traded grantor trusts that behave similarly to ETFs. All such vehicles within this wider class are typically referred to as exchange traded products, or ETPs. Shares of an ETP are securities that represent a legal right of ownership or beneficial interest in an underlying portfolio of securities or other assets held by the issuing fund/product, as applicable. The assets held by an ETP may include individual stocks, bonds, cash, commodities, derivatives, or any other tradable asset, including contracts based on the value of any of the foregoing.

Shares of an ETP are designed to be listed on a securities exchange and traded over the exchange just like other securities. ETPs thus allow an investor to own an undivided interest or "basket" of assets held by the ETP by simply purchasing shares in the individual ETP. Many existing ETPs hold a mix of assets that aim to replicate or otherwise match the characteristics of a particular published index. These ETPs allow investors to have exposure to the index by purchasing shares of the single ETP. Other existing ETPs seek to provide exposure to commodities (such as gold, silver, oil and gas), a portfolio of currencies or futures contracts and may or may not track an index or benchmark. Because of their low cost and tax advantages, ETPs have grown in popularity in recent years.

Figure 1:
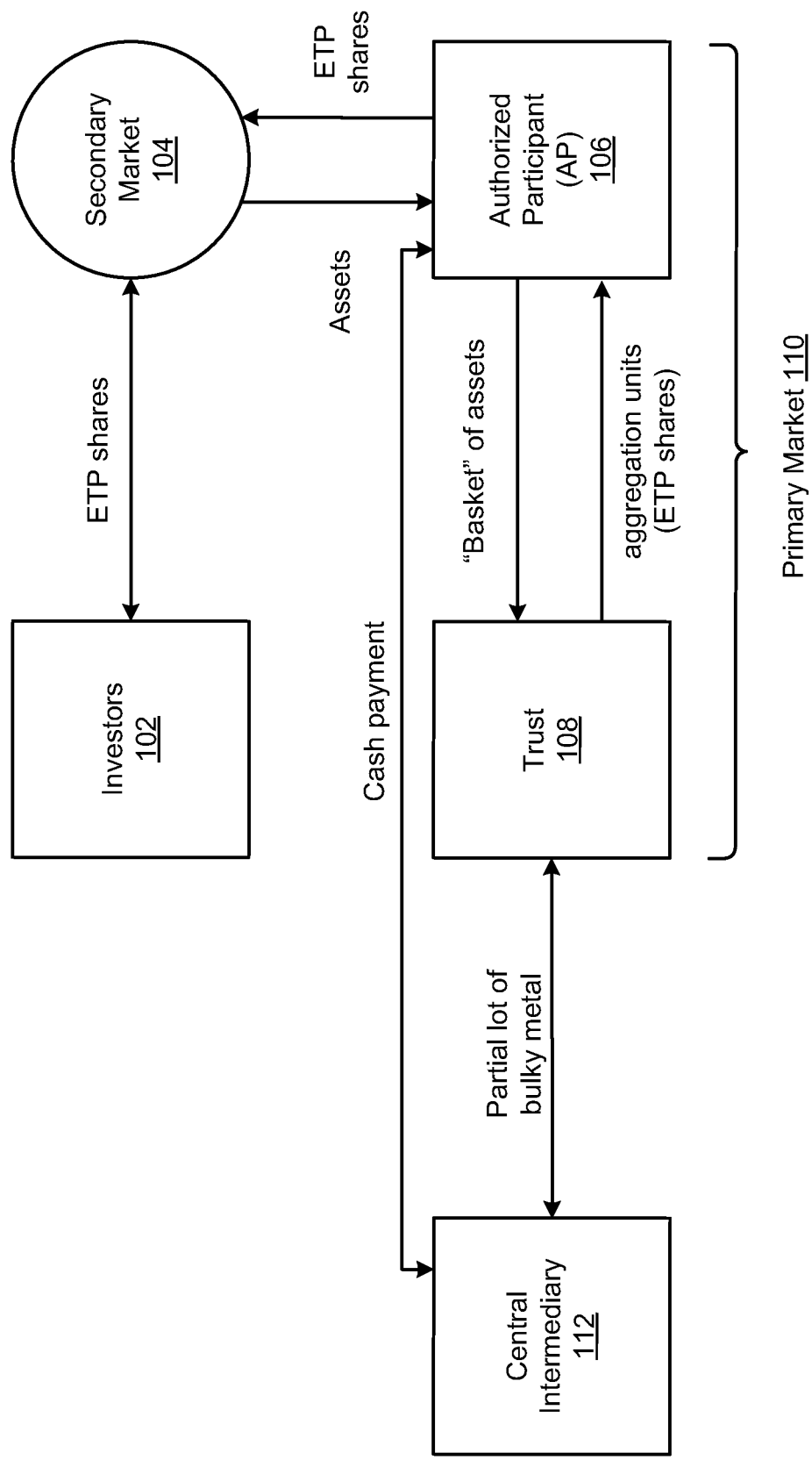
FIG. 1 illustrates a creation process for an ETP, in accordance with an embodiment of the invention.

FIG. 1 illustrates a simplified share creation process for an ETP (or "trust") in a primary market 110 in accordance with one embodiment. The ETP shares are generally made available to investors 102 through a two-tiered market structure, which includes the primary market 110 and a secondary market 104. In the primary market 110, issuance of new shares of the ETP can be created only in multiples of a minimum block of shares ("creation units"). Because of the large size of the minimum creation units required for purchases of new ETP shares, these shares are generally only available in the primary market 110 to certain institutional investors, known as authorized participants (APs) 106. APs 106 are typically large institutional broker dealers or market makers that transact directly with an ETP for purchases of creation units of the ETP shares at the end of day net asset value ("NAV") for the ETP.

As shown, the consideration for purchase of a creation unit of an ETP generally comprises a deposit of a basket of assets via an in-kind transfer in exchange for a creation unit of shares of the ETP issued by a trust 108 to the AP 106. The deposit assets are obtained and delivered by the AP 106 to the trust, which are then added to the applicable trust's holdings or inventory. The particular mix of assets and their respective amounts to be deposited by the AP 106 in exchange for the creation units are specified by a creation basket, which is published each business day by the trust 108. For example, a creation basket may specify five warrants of base metal (125,000 kg) that results in the creation of 12,500 ETP shares. Thus, each share that can be sold on the secondary market 104 to investors 102 will initially represent an undivided beneficial interest in the net assets of the trust consisting of 10 kg of the base metal.

As the amount of base metal in the specified basket will not generally be readily divisible by bulky lots available in the market place, the AP 106 is unlikely to be able to provide an amount of the metal that corresponds exactly to the target amount published by the trust 108 on any given day. This target amount may be published as a weight of metal, value of metal, or in any other terms by which a specific amount of the base metal may be determined. The AP 106 is therefore allowed to deliver an amount of the base metal within a target range of the published target amount. For example, in one embodiment, the weight of each lot of metal delivered must be within 2% of the target weight specified. To compensate for the value difference between the metal delivered and the published target amount, the trust 108 utilizes an equalization lot of the metal that is jointly owned by the trust 108 and a central intermediary 112.

In the case where too much metal is delivered by the AP 106 (a "heavy create") the central intermediary 112 exchanges ownership of the excess weight for cash (or other value) at a rate set by a market entity, such as the London Metal Exchange (LME). In one embodiment, the central intermediary 112 takes ownership from the trust 108 of an amount of metal in the equalization lot equivalent to the excess weight delivered. The central intermediary 112 also makes a payment of cash (or other value) for the excess weight of metal to the AP 106 at the current LME rate. In this way, the net value transferred from the AP 106 to the trust 108 is precisely equivalent to one creation unit of shares based on the targeted amount published and that business day's NAV.

The alternative case is where the AP 106 delivers less metal than the published target amount (a "light create"). In this instance, the trust 108 receives ownership from the central intermediary 112 of an amount of metal in the equalization lot equivalent to the amount that the delivered metal is underweight. The central intermediary 112 is compensated for this by a transfer of cash (or other value) from the AP 106 at the current LME rate. This results in a net transfer of value from the AP 106 to the trust 108 that exactly matches that of one creation unit of shares as specified by the target amount published and that business day's NAV.

In an alternative embodiment, rather than exchanging ownership of metal in the equalization lot between the trust 108 and the central intermediary 112 immediately, the transfer may take place in the form of accounts receivable/payable transactions. In a further embodiment cash transfers may take place through the trust 108, rather than directly between the AP 108 and the central intermediary 112.

In one embodiment, the authorized participant 106 is permitted only to initiate a light create if the central intermediary 112 currently owns enough metal in the equalization lot (or additional inventory) to make up the difference. In this embodiment, a transaction would not force more metal to be brought into the trust by the creation of further equalization lots. In another embodiment, which may also exhibit the previously described feature, the central intermediary charges a premium for metal exchanges that are part of heavy or light creates. In another embodiment, additional lots may be used if the original equalization lot is exhausted by light creates or heavy redeems. A mechanism may be used to make sure that the central intermediary holds enough lots in addition to the shared lot to support such an event. This way, the trust is not forced to turn down light creates or heavy redeems because the central intermediary does not hold enough inventory in just the shared lot.

Figure 2:
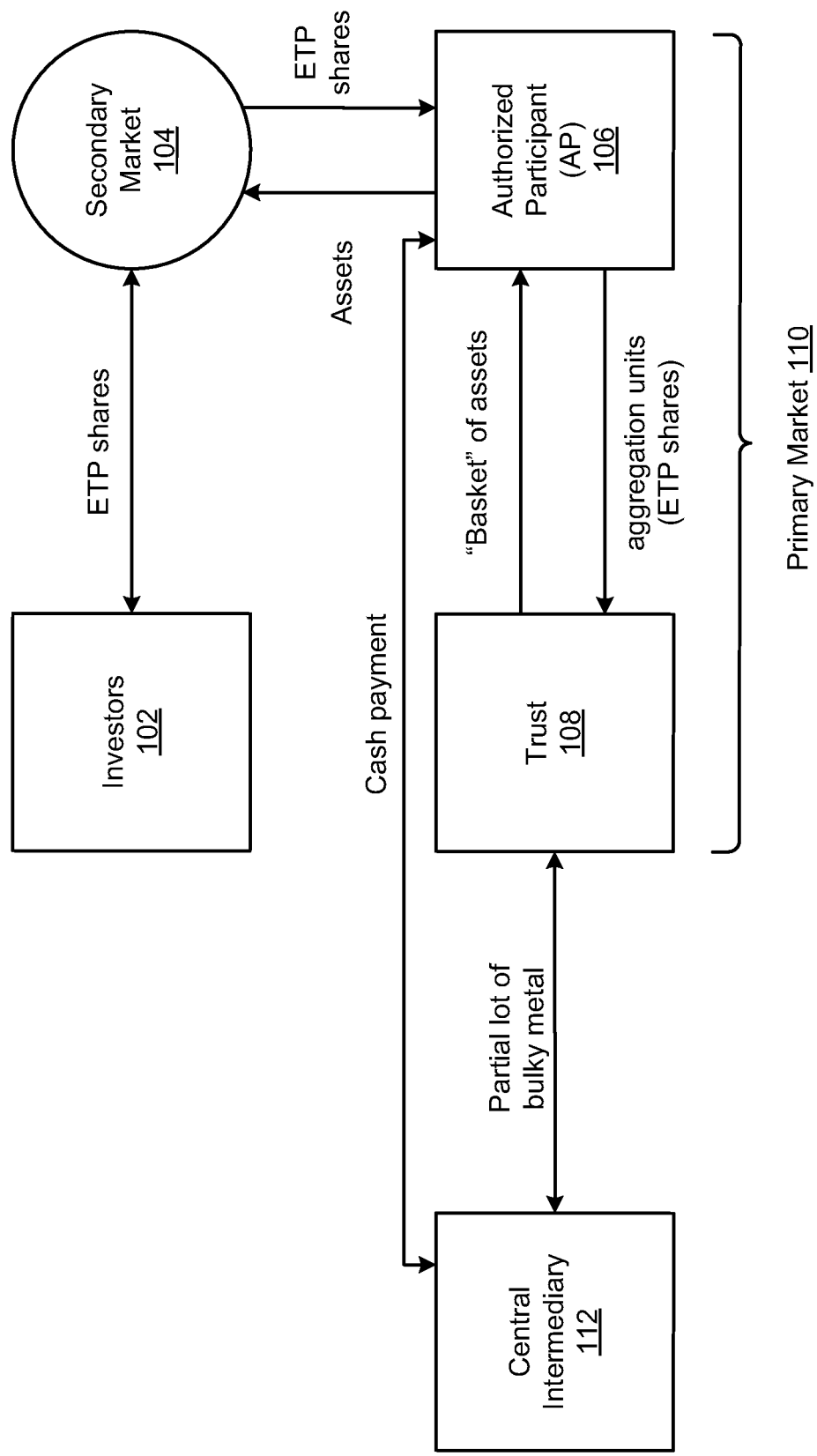
FIG. 2 illustrates a redemption process for an ETP, in accordance with an embodiment of the invention.

The opposite process occurs for a redemption of ETP shares, as shown in FIG. 2. In one embodiment, an AP 106 can redeem shares of an ETP by delivering a block of the shares (e.g., the same size block as in a creation unit) to the trust. In exchange, the trust delivers via an in-kind transfer the deposit assets specified in the creation basket, as published that day.

If the amount of metal in the lot delivered to the AP 106 is less than the published target amount (a "light redeem"), the trust transfers ownership of an amount of metal in the equalization lot equivalent to the difference to the central intermediary 112 and the central intermediary 112 delivers cash to the AP 106 to compensate for the difference. If the amount of metal delivered to the AP 106 is greater than the published target amount, the AP 106 transfers cash (or other value) to the central intermediary equivalent to the current LME value of the excess metal delivered and the central intermediary transfers ownership of metal in the equalization lot to the trust 108 to compensate for this excess metal. In some embodiments, a "heavy redeem" is permitted only if the central intermediary currently owns enough metal in the equalization lot to make up the difference without bringing in new metal from another lot.

In some embodiments, a creation/redemption initiated on a day, T, will be due to be settled three days later, at T+3. The physical metal to be delivered or transferred via warrant is identified on T. The weight discrepancy of metal delivered is reported to the central intermediary 112 no later than T+1. The transfer of cash between the central intermediary 112 and the AP 106, and the transfer of the metal, occurs no later than T+3.

In contrast to the primary market 110, in which APs 106 may transact for the creation or redemption of creation size units of an ETP, individual investors 102 can access the shares in a secondary market 104. Once the block of the shares in the creation size units is received by the AP 106, the shares may be broken down into less than creation unit sizes (including individual shares) and sold by the AP 106 directly to customers or over a secondary market 104, where individual investors 102 may buy and sell shares of the ETP through their brokerage accounts. An intermediary, such as a broker/dealer or financial advisor, may advise investors 102 directly and recommend and sell the shares. Conversely an AP 106 may obtain the assets or shares required for a creation/redemption in the primary market 110 by trading in the secondary market 104.

Where in the above description the trust 108 initiates a transaction or otherwise acts, this is administered by a management facility. In one embodiment, the management facility is one or more computer systems of one or more trustees who manage the day to day operation of the trust 108. In another embodiment these actions are entirely automated by one or more computer systems programmed for the management of the trust 108. The computers that comprise such a management facility may be at a centralized location, or may be at geographically remote locations and communicatively coupled via a network.

Process flow and systems for trading ETFs are described in more detail in U.S. Pat. No. 7,937,316 and U.S. Provisional Application No. 61/142,609, filed Jan. 5, 2009, each of which is incorporated by reference in its entirety.

Figure 3:
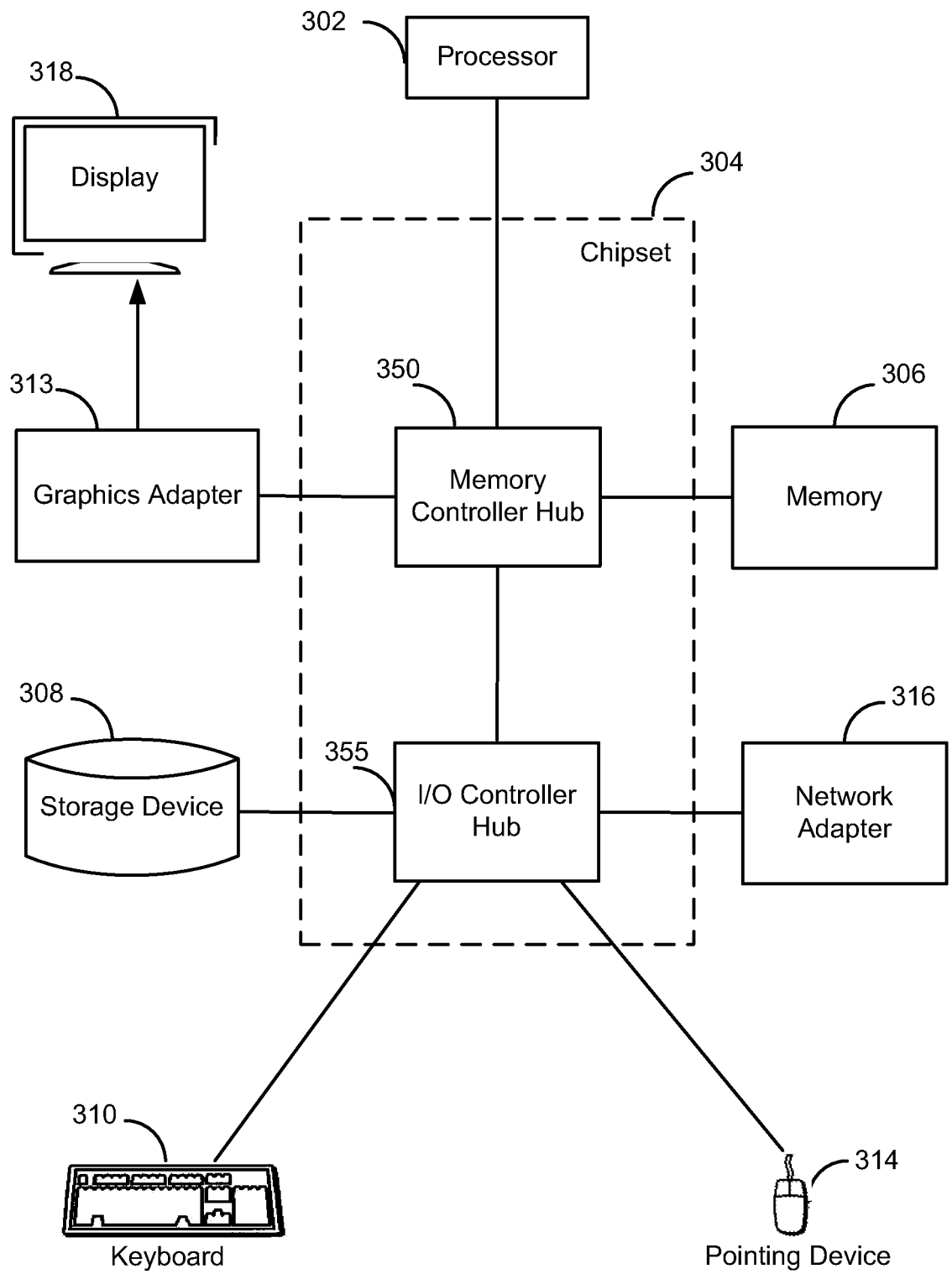
FIG. 3 is a block diagram illustrating an example of a computer for use by an authorized participant, a central intermediary, or investors, or in a management facility of the ETP.

FIG. 3 is a high-level block diagram illustrating an example of a computer 300 for use by an AP 106, the central intermediary 112 or investors 102, or as part of a management facility for the trust, in accordance with embodiments of the invention. Illustrated are at least one processor 302 coupled to a chipset 304. The chipset 304 includes a memory controller hub 350 and an input/output (I/O) controller hub 355. A memory 306 and a graphics adapter 313 are coupled to the memory controller hub 350, and a display device 318 is coupled to the graphics adapter 313. A storage device 308, keyboard 310, pointing device 314, and network adapter 316 are coupled to the I/O controller hub 355. Other embodiments of the computer 300 have different architectures. For example, the memory 306 is directly coupled to the processor 302 in some embodiments.

The storage device 308 is a computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and in some embodiments is used in combination with the keyboard 310 to input data into the computer system 300. The graphics adapter 313 displays images and other information on the display device 318. In some embodiments, the display device 318 includes a touch screen capability for receiving user input and selections. The network adapter 316 couples the computer system 300 to the network 301. Some embodiments of the computer 300 have different and/or other components than those shown in FIG. 3.

The computer 300 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 308, loaded into the memory 306, and executed by the processor 302.

The types of computers 300 used by the entities of FIG. 1 can vary depending upon the embodiment and the processing power used by the entity. For example, the fund manager 108 may use a desktop PC, whereas an investor 102 may enter investment decision on a portable device with a small display 318 with touch screen capabilities but lack a keyboard 310 or pointing device 214.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, the techniques described herein have been described as applied to a grantor trust type ETP. The method may equally be applied to other financial instruments, possibly those not yet created, where shares of the instrument are traded and are based on an underlying set of tradable securities or other assets.

Where specific time frames have been referenced, these represent current best practice with regards to regulation and market expectations. Such time frames should not be considered limiting and are presented purely to illustrate how the current invention can be implemented in current financial markets.

Some portions of this description describe the embodiments of the invention in terms of algorithms and symbolic representations of operations on information. These algorithmic descriptions and representations are commonly used by those skilled in the art to convey the substance of their work effectively to others skilled in the art. These operations, while described functionally, computationally, or logically, may be understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Such a computer program may be stored in a tangible computer readable storage medium or any type of media suitable for storing electronic instructions. Embodiments of the invention may also relate to an apparatus for performing the operations described herein. This apparatus may be specially constructed for the required purposes, and/or it may comprise a general-purpose computing device selectively activated or reconfigured by a computer program stored in the computer.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method for creating shares of an exchange traded product (ETP), the method comprising:
   publishing ETP data on a non-transitory computer readable medium by a computing system of a management facility that administers the ETP, the ETP data specifying a creation basket of assets that comprise an amount of a physical commodity and a corresponding amount of shares of the ETP to be issued in exchange for the creation basket of assets, wherein the physical commodity is not readily divisible;
   electronically receiving a creation request from an authorized participant at the computer system of the management facility;
   receiving, by the management facility from the authorized participant, an amount of the physical commodity delivered to the management facility, where the delivered amount differs from the amount of the physical commodity specified in the creation basket of assets;
   initiating a first transaction on a primary market by the computing system of the management facility, the first transaction providing the corresponding amount of shares of the ETP to the authorized participant;
   determining a difference between the amount of the physical commodity received from the authorized participant and the amount of the physical commodity specified in the ETP data; and
   initiating a second transaction by the computer system of the management facility with a central intermediary, the second transaction transferring between the ETP and the central intermediary a partial ownership interest of at least one equalization lot of the physical commodity, the at least one equalization lot being jointly owned by the ETP and the central intermediary, the transferred partial ownership interest corresponding to the difference between the amount of the physical commodity received from the authorized participant and the amount of the physical commodity specified in the ETP data.

2. The method of claim 1, further comprising sending instructions for a third transaction by the computer system of the management facility, the third interaction transferring value between the authorized participant and the central intermediary, the transferred value corresponding to the difference between the amount of the physical commodity received from the authorized participant and the amount of the physical commodity specified in the ETP data.

3. The method of claim 1, wherein the ETP is a grantor trust.

4. The method of claim 1, wherein the authorized participant only delivers an amount of the physical commodity of lesser value than the shares to be created when the central intermediary owns a large enough share of the at least one equalization lot to compensate for the difference between the amount of the physical commodity received from the authorized participant and the amount of the physical commodity specified in the ETP data.

5. The method of claim 1, wherein the physical commodity is a base metal.

6. The method of claim 2, wherein the third transaction occurs no later than three days after the creation request.

7. The method of claim 2, wherein the third transaction comprises a transfer of cash.

8. The method of claim 1, wherein the amount of the physical commodity specified in the ETP data is specified as a weight of the commodity.

9. The method of claim 1, wherein the amount of the physical commodity specified in the ETP data is specified as a value of the physical commodity.

10. A method for redeeming shares of an exchange traded product (ETP), the method comprising:
    publishing ETP data on a non-transitory computer readable medium by a computing system of a management facility that administers the ETP, the ETP data specifying an amount of shares of the ETP and a corresponding redemption basket of assets that comprise an amount of a physical commodity to be provided in exchange for the amount of shares, wherein the physical commodity is not readily divisible;
    electronically receiving a redemption request from an authorized participant at the computer system of the management facility;
    receiving, from the authorized participant, the amount of shares of the ETP specified in the ETP data;
    initiating a first transaction on a primary market by the computing system of the management facility, the first transaction providing a transfer of assets to the authorized participant, the transferred assets including an amount of the physical commodity delivered to the authorized participant, where the delivered amount differs from the amount of the physical commodity specified in the ETP data;
    determining a difference between the amount of the physical commodity provided to the authorized participant and the amount of the physical commodity specified in the ETP data; and
    initiating a second transaction by the computer system of the management facility with a central intermediary, the second transaction transferring between the ETP and the central intermediary a partial ownership interest of at least one equalization lot of the physical commodity, the at least one equalization lot being jointly owned by the ETP and the central intermediary, the transferred partial ownership interest corresponding to the difference between the amount of the physical commodity provided to the authorized participant and the amount of the physical commodity specified in the ETP data.

11. The method of claim 10, further comprising sending instructions for a third transaction by the computer system of the management facility, the third interaction transferring value between the authorized participant and the central intermediary, the transferred value corresponding to the difference between the amount of the physical commodity provided to the authorized participant and the amount of the physical commodity specified in the ETP data.

12. The method of claim 10, wherein the ETP is a grantor trust.

13. The method of claim 10, wherein the amount of the physical commodity provided to the authorized participant is greater than the amount of the physical commodity specified in the ETP data when the central intermediary owns a large enough share of the at least one equalization lot to compensate for the difference between the amount of the physical commodity provided to the authorized participant and the amount of the physical commodity specified in the ETP data.

14. The method of claim 10, wherein the physical commodity is a base metal.

15. The method of claim 11, wherein the third transaction occurs no later than three days after the first transaction.

16. The method of claim 11, wherein the third transaction comprises a transfer of cash.

17. The method of claim 10, wherein the amount of the physical commodity specified in the ETP data is specified as a weight of the physical commodity.

18. The method of claim 10, wherein the amount of the physical commodity specified in the ETP data is specified as a value of the commodity.

19. A method for creating shares of an exchange traded product (ETP), the method comprising:

publishing ETP data on a non-transitory computer readable medium by a computing system of a management facility that administers the ETP, the ETP data specifying a creation basket of assets that comprise an amount of a physical commodity and a corresponding amount of shares of the ETP to be issued in exchange for the creation basket of assets, wherein the physical commodity is not readily divisible;

electronically receiving a creation request from an authorized participant at the computer system of the management facility;

receiving, from the authorized participant an amount of the physical commodity delivered to the management facility, where the delivered amount differs from the amount of the physical commodity specified in the creation basket of assets;

initiating a first transaction on a primary market by the computing system of the management facility, the first transaction providing the corresponding amount of shares of the ETP to the authorized participant;

determining an obligation comprising either a debt owed by the ETP to the authorized participant or a credit due to the ETP from the authorized participant, the debt or credit corresponding to a difference between the amount of the physical commodity received from the authorized participant and the amount of the physical commodity specified in the ETP data; and initiating a second transaction by the computer system of the management facility with a central intermediary, the second transaction transferring between the ETP and the central intermediary a partial ownership interest of a jointly owned equalization lot of the physical commodity, the partial ownership interest corresponding to the determined obligation, the second transaction further transferring the determined obligation of the ETP to the central intermediary.

20. The method of claim 19, further comprising initiating a third transaction by the computer system of the management facility, the third interaction transferring value between the authorized participant and the central intermediary, the transferred value corresponding to the determined obligation.

* * * * *